Nov. 25, 1969     H. HERMANNS     3,479,873
SELF-CLEANING ELECTRODES
Filed Nov. 13, 1967     3 Sheets-Sheet 1
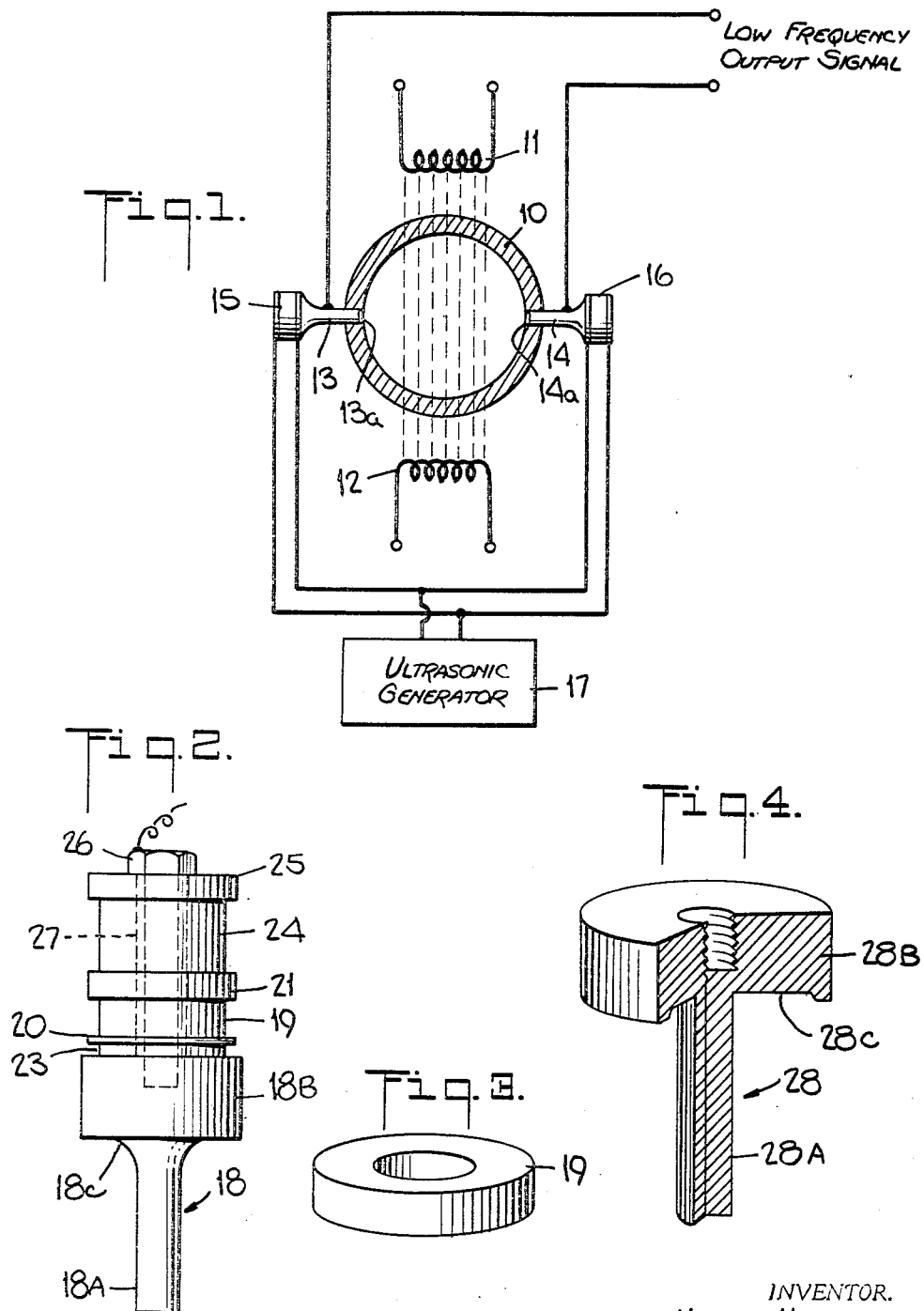
INVENTOR.
HENRY HERMANNS
BY
ATTORNEY

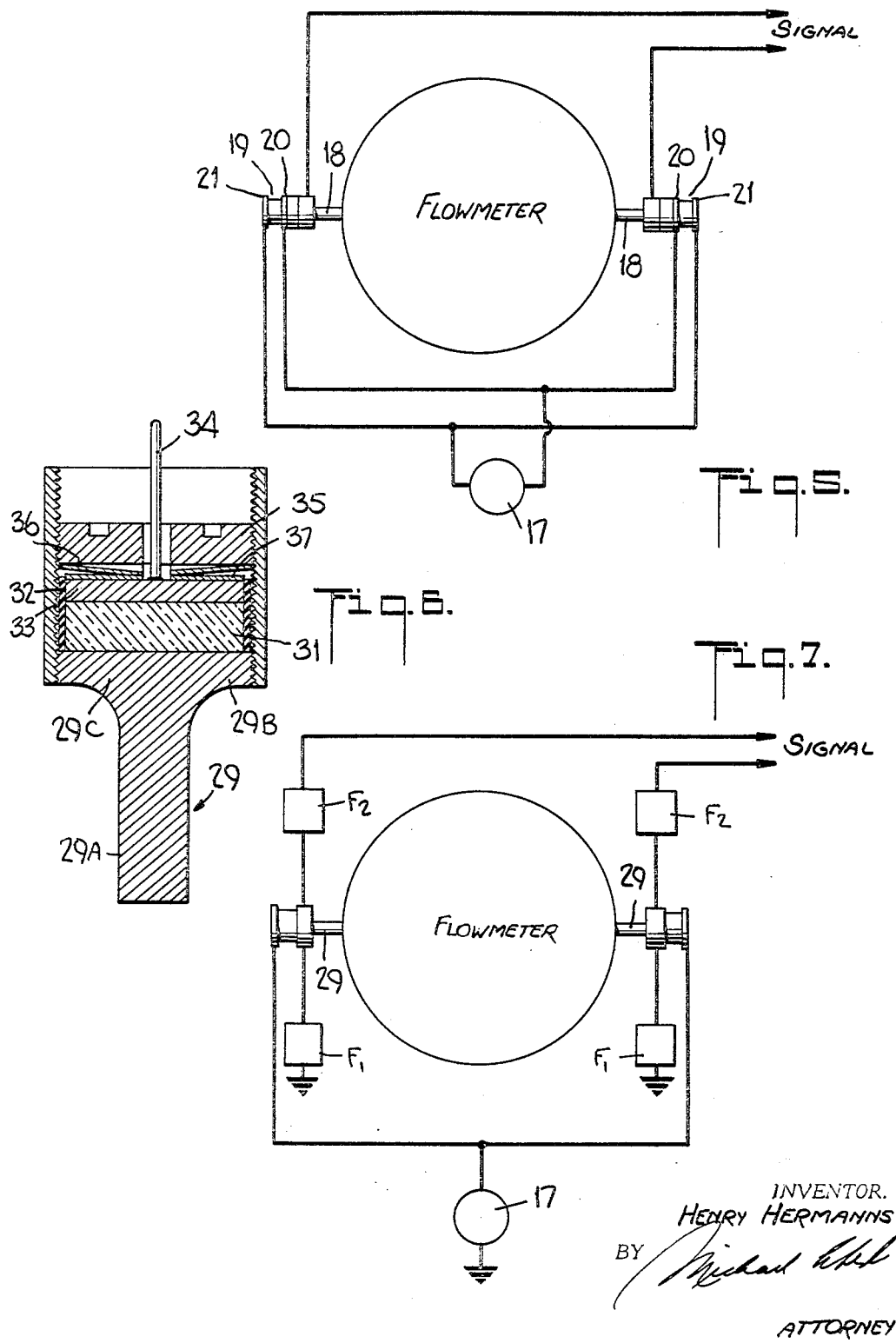

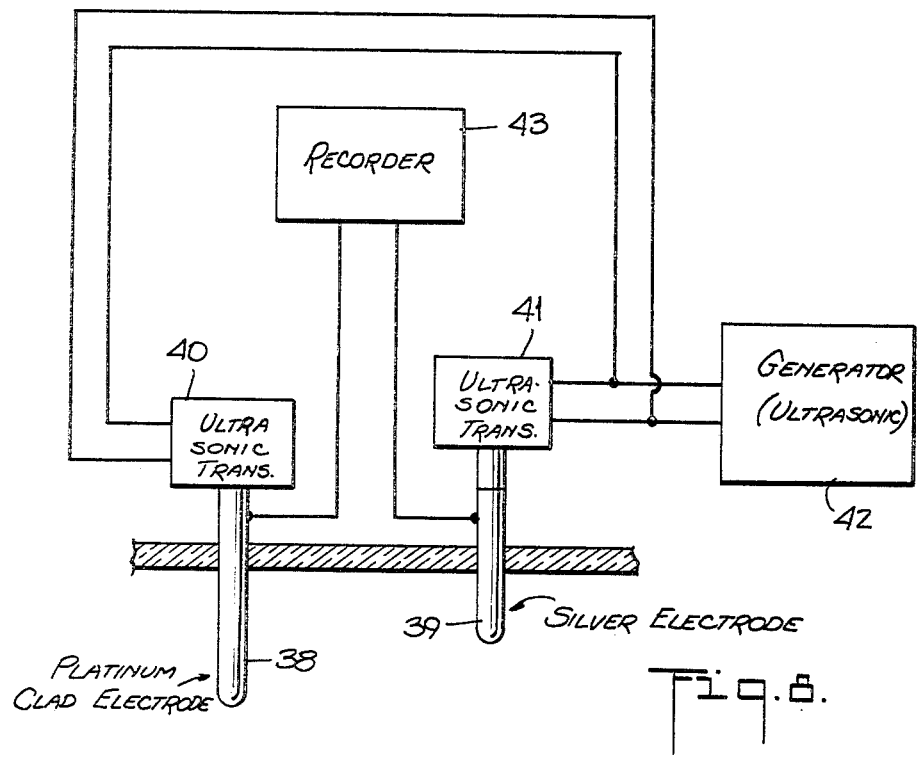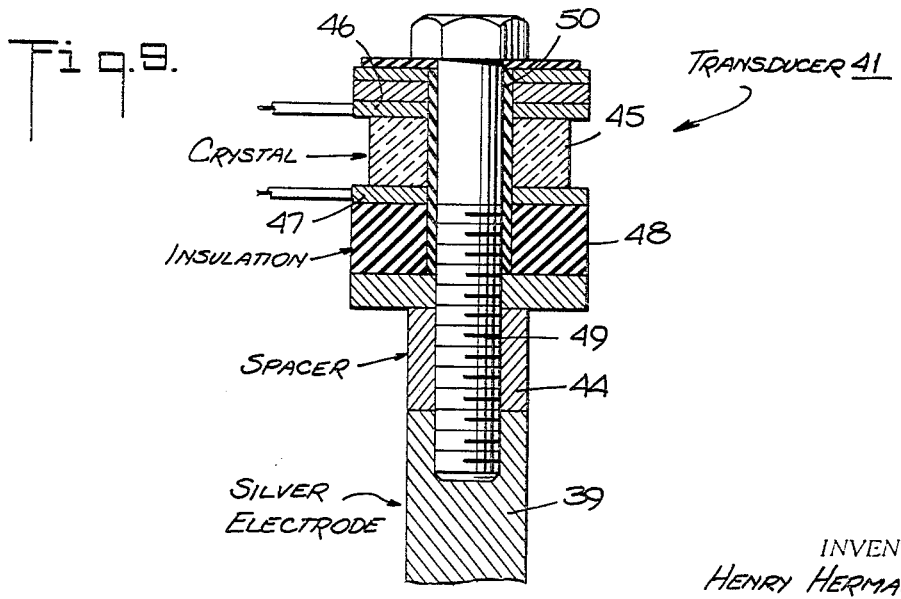

United States Patent Office 3,479,873
Patented Nov. 25, 1969

1

3,479,873
SELF-CLEANING ELECTRODES
Henry Hermanns, Huntingdon Valley, Pa., assignor to Fischer & Porter Co., Warminster, Pa., a corporation of Pennsylvania
Continuation-in-part of application Ser. No. 556,045, June 8, 1966. This application Nov. 13, 1967, Ser. No. 682,433
Int. Cl. G01f 1/02
U.S. Cl. 73—194         9 Claims

ABSTRACT OF THE DISCLOSURE

A self-cleaning electrode incorporated in magnetic flowmeters, measurement probes and other instruments in which an electrode is exposed to a contaminating fluid which tends to coat the electrode with material which interferes with its proper operation, the electrode having an ultrasonic transducer operatively coupled thereto to produce ultrasonic energy which is transmitted to the fluid to create cavitation effects therein acting to clean the exposed surface of the electrode.

Related application

This application is a continuation-in-part of my pending application Ser. No. 556,045, filed June 8, 1966, now abandoned.

This invention relates generally to self-cleaning electrodes, and in particular to an electrode which is included in a measuring instrument for a fluid having pollutants therein which tend to contaminate the electrode, the electrode being provided with an ultrasonic transducer to decontaminate the active surface thereof.

In such instruments as magnetic flowmeters and measurement probes for fluid process control, electrodes are incorporated therein having active surfaces exposed to the fluid. These electrodes become coated with contaminants contained in the fluid, as a consequence of which the operation of the instrument is impaired.

An example of such an instrument is a magnetic flowmeter adapted to measure volume rates of fluids which present difficult handling problems, such as corrosive acids, sewage, slurries, and detergents. In a magnetic flowmeter, a uniformly distributed electromagnetic field is established which is mutually perpendicular to the longitudinal axis of the tube through which the fluid flows and to the axes of the meter electrodes.

Since the velocity of the fluid is directed along the longitudinal axis of the flow tube, the voltage induced within the fluid will be perpendicular both to the velocity of the fluid and the flux linkages of the magnetic field. The instantaneous voltage developed across the meter electrodes represents an average fluid velocity of the flow profile passing the electrodes at a given moment, and the flowmeter will therefore produce an output signal equal to a continuous average flow rate regardless of whether the flow profile is laminar or turbulent.

For proper operation of a magnetic flowmeter, the electrical conductivity of the path extending between the electrodes must be relatively high. The overall resistance of this path is determined by that of the fluid itself in series with the interface resistance between the fluid and the active surface of the electrodes. When meters are used to measure polluted fluids, such as fluids containing oils or sludge, as is often the case in many sewage systems, the oils or other contaminants tend to coat and adhere to the active surface of the electrodes. Since such coatings are insulating in character, as the coatings build up the resultant interface resistance becomes very high and the electrical conductivity of the path between the electrodes is substantially diminished.

2

It has been found that when the resistance of the path rises beyond a predetermined value, the resultant voltage drop and attenuation of the output signal has an adverse effect on the meter accuracy. It has, therefore, been necessary to remove such contaminated meters from the flow stream in order to clean the electrode surface. This, of course, requires that the pipe line be disassembled, thereby temporarily shutting down the process.

Measurement probes and other instruments are known which include electrodes exposed to a contaminating fluid which tends to coat the electrodes and interfere with the measurement. Thus in an oxidation-reduction potential measurement probe, such as the ORP immersion-type probe manufactured by The Fischer & Porter Co., electrodes are placed in a solution, such as a hypochlorite bleach solution to which chlorine is added. The probe electrodes form a voltaic cell and provide a signal which increases as chlorine is added.

As pointed out in the Instruction Bulletin on models 17B1102 and 17B1103, published by Fischer & Porter Co., cell operation may be impaired due to excess deposit on the electrodes. To remove this deposit or scale, the bulletin suggests a technique which requires disconnecting the probe from its operating circuit, and the application of voltages to build up hydrogen on the electrodes. But should this technique fail, to restore adequate operating sensitivity, the ORP probe must be withdrawn from the process and the electrodes cleaned chemically. In either instance, the probe is put out of operation during this cleaning process.

Accordingly, it is the main object of this invention to provide means operating in conjunction with electrodes whose exposed surfaces are subject to a contaminating fluid to maintain these surfaces clean without interrupting the normal operation of the electrodes.

More specifically, it is an object of the invention to provide an instrument having ultrasonic transducers coupled to the electrode thereof to produce ultrasonic energy for continuously decontaminating the active electrode surfaces exposed to polluted fluid, without in any way interfering with the normal signal output developed at the electrodes, whereby the accuracy of the instrument is maintained at all times.

A significant feature of the invention resides in a transducer-electrode assembly wherein the impedance of the ultrasonic transducer is effectively matched to that of the electrode to afford an efficient transfer of ultrasonic energy therebetween. In one embodiment of the invention, the transducer is electrically insulated from the electrode but acoustically coupled thereto, thereby separting the high frequency signal derived from the electrodes. In another embodiment, the electrode and transducer are electrically and acoustically coupled, in which situation the high and low frequency voltages are separated by filter means.

Briefly stated, these objects are accomplished in the context of a magnetic flowmeter having a pair of electrodes mounted at diametrically opposed positions on a flow tube through which passes a contaminated fluid whose flow rate is to be measured, a magnetic field being established across the tube whereby a voltage is induced in said fluid which is picked up by said electrodes to provide an output signal, an ultrasonic transducer being coupled to the exterior ends of said electrodes to produce ultrasonic energy which is directed by said electrodes into the contaminated fluid, the resultant cavitation of the fluid acting to decontaminate the active surfaces or tips of the electrodes which overwise tend to be contaminated by the fluid. In the context of an ORP probe, similar expedients are used in conjunction with the electrodes thereof, and means are also provided to match the resonant frequencies of the electrodes.

For a better understanding of the invention, as well as other objects and further features thereof, reference is made to the following detailed description of the invention to be read in conjunction with the accompanying drawings, wherein:

FIG. 1 is a schematic diagram of a self-cleaning flowmeter in accordance with the invention, which meter has ultrasonic transducers operatively coupled to the electrodes;

FIG. 2 is an elevational view of an insulated crystal electrode assembly;

FIG. 3 is a perspective view of the crystal employed in the assembly shown in FIG. 2;

FIG. 4 is a perspective view of an alternative form of electrode to be used in the insulated assembly;

FIG. 5 is a schematic diagram of the electrical circuit for the insulated assembly;

FIG. 6 is a sectional view of a non-insulated crystal-electrode assembly;

FIG. 7 is a schematic circuit diagram of the electrical arrangement for the non-insulated assembly;

FIG. 8 schematically illustrates a measurement probe in accordance with the invention; and FIG. 9 is an elevational view of one probe electrode.

Referring now to the drawing, and more particularly to FIG. 1, a magnetic flowmeter in accordance with the invention includes a flow tube 10, formed of any suitable non-magnetic material. An acceptable non-metallic material for this purpose is a plastic reinforced with fiberglass. If the tube is formed of a conductive material, such as non-magnetic stainless steel, it must be lined with a layer of insulating material, such as "Teflon" or "neoprene" or any other substance preventing short-circuiting of the voltage induced in the fluid passing through the tube.

A uniform magnetic field is produced across the tube by a pair of coils 11 and 12 on diametrically opposed sides thereof. To focus the magnetic field in a direction at right angles to the fluid flow, a laminated core may be used in conjunction with the coils in an arrangement of the type shown in the U.S. Patent to Head 3,055,342, dated Oct. 24, 1961. The excitation of the coils is preferably with a commercially available 60-cycle alternating voltage, although other frequencies may be used in practice. It is also possible to use non-uniform field configurations which are designed to compensate for asymmetrical velocity profiles.

Voltage generated by the flow of fluid through the magnetic field is detected by two electrodes 13 and 14 mounted at diametrically opposed positions which are normal to the direction of the magnetic field. The active faces 13a and 14a of the tips of these electrodes are preferably disposed flush with the interior wall of the flow tube 10, the electrodes being gasketed with insulating sleeves. The electrodes may be made of stainless steel, or for highly corrosive uses, platinum may be employed.

The shape of the electrodes will be considered in greater detail in connection with the other figures, the showing in FIG. 1 being schematic. Attached to the exterior ends of the electrodes 13 and 14 are ultrasonic transducers 15 and 16, respectively, which serve to generate ultrasonic energy when excited by an ultrasonic generator 17 connected thereto.

Transducers 15 and 16 are standard piezoelectric or magnetostrictive elements. Preferably they take the form of piezoelectric material such as a ceramic zirconate lead titanate element operating in the kilocycle range. A more detailed description of such crystals and other forms of ultrasonic transducers and of ultrasonic generators for operating the transducers, may be found in the text, "Ultrasonics," by Benson Carlin, McGraw-Hill Book Company, 2nd edition, 1960.

The use of ultrasonic techniques to effect cleaning and degreasing of parts, is well known, the cleaning action depending on cavitation and acceleration of the cleaning fluid in which the part is immersed. In the present invention, ultrasonic energy is applied to a contaminated fluid passing through the flow tube of a magnetic flow meter, the energy being transmitted to the fluid through the electrodes of the meter whereby the contaminated fluid being metered serves also to decontaminate the very electrode elements which it tends to contaminate.

In this way, the active surfaces of the electrodes in contact with the fluid are continuously cleaned during operation of the meter. Thus the interface resistance is held at a low value, and the conductivity of the path between the electrodes is maintained at a high level, whereby the meter accuracy is unimpaired in the course of operation. This obviates the need to disassemble the pipe line containing the meter, and there is no need to shut down the process. It will be appreciated that while the invention is shown with a continuously operated ultrasonic electrode cleaning system, the system may be operated intermittently, if desired.

The transducer and electrode assembly may assume two distinct designs, in one of which the transducer is electrically insulated from the electrodes, and in the other of which there is direct contact without insulation. Referring now to FIGS. 2 and 3, an insulated design is shown which includes an electrode 18 and a crystal 19.

Electrode 18 is shaped as a modified exponential horn, whereby the tip section 18A merges with the head section 18B through a section 18C having a large transitional radius. This horn configuration is desirable in order that ultrasonic energy may effectively be transmitted through a velocity amplifier, and whereby the crystal coupled to the head section has its impedance effectively matched to that of the tip section.

The piezoelectric crystal, as shown separately in FIG. 3, is in annular form, and is sandwiched between annular contact electrodes 20 and 21 which may be of copper or stainless steel. An insulating washer 23, which may be of quartz or Pyrex glass, is interposed between crystal contact electrode 20 and the head 18B of the meter electrode to electrically isolate the crystal therefrom and at the same time afford good accoustic transmission between the crystal and the meter electrode, thereby allowing the maximum amount of energy to get to the electrode tip.

On the opposite side of the piezoelectric crystal 19, acoustic transmission is not a factor. Hence a less brittle insulating sleeve 24 may be used, such as boron nitride, mica, or fiberglass. Above the insulating sleeve 24 is a metal washer 25 preferably of stainless steel. The entire assembly is clamped together by a bolt 26 passing through the stack of annular elements and threadably received in the head 18B. The bolt passes through an insulating bushing 27 to isolate it from the various elements.

In operation, the signal from the meter electrode 18 is taken from a lead connected to the bolt and ultrasonic power for the crystal 19 is applied to contact electrodes 20 and 21.

In lieu of an electrode having an exponential horn configuration, a stepped horn arrangement may be employed, as shown in FIG. 4, wherein the meter electrode 28 includes a tip section 28A, a drum-shaped head section 28B, and a transitional step 28C therebetween. The remaining elements of this assembly are exactly as shown in FIG. 2.

FIG. 5 shows schematically the manner in which the insulated crystal and electrode assembly of FIG. 2 or FIG. 4 is connected. It will be seen that the high frequency output of ultrasonic generator 17 is connected in parallel to the crystal contact electrodes 20 and 21 of the crystal 19 in both assemblies, whereas the two meter electrodes 18, which are electrically isolated from the crystal, are connected to lines providing the low frequency output signal.

Referring now to FIG. 6, an uninsulated crystal-electrode assembly is shown. This has the advantage of affording direct accoustic contact between the crystal and electrodes, thereby making possible more efficient transmission of ultrasonic energy. But because the direct acoustic contact also provides an electrical connection, it creates a problem in that it is necessary to segregate the low-frequency signal of the meter electrodes from the high-frequency voltage applied to the crystal. The manner in which this is accomplished will be discussed later in connection with FIG. 7.

In the assembly shown in FIG. 6, the meter electrode 29 has a tip 29A, a head 29B and an exponential transition section 29C. Mounted on head 29B and projecting therefrom is a tubular metal shell 30 which is internally threaded and which forms a socket for receiving a disc-shaped piezoelectric crystal 31. One face of the crystal is pressed against head 29B, thereby making direct contact between the crystal and the electrode to facilitate the transmission of ultrasonic energy.

An insulating sleeve 32 is interposed between the periphery of crystal 31 and the inner wall of shell 30. A disc-shaped contact electrode 33 is positioned over the other face of the crystal within the shell, a lead 34 being connected thereto which passes through the central bore in a metal locking nut 35. A cone-shaped compressible washer 36, preferably of stainless steel, is positioned between nut 35 and contact electrode 33 to prevent the nut from vibrating loose, while an insulating washer is placed between the cone washer and electrode 33 to isolate nut 35 therefrom.

The circuit for the non-insulated assembly is shown in FIG. 7, and it will be seen that filters $F_1$ connected between electrodes 29 and ground block the low-frequency signal from the electrodes, but pass the high frequency crystal drive current from ultrasonic generator 17. Filters $F_2$ interposed between the meter electrodes 29 and the output lines, block high frequency current but pass the low frequency signal.

Referring now to FIG. 8, there is shown schematically an oxidation-reduction potential measurement probe constituted by electrodes 38 and 39. An oxidation-reduction potential (ORP) is a voltage generated electrochemically by electron migrations which involve exchanges of electrical charges. Oxidation of a substance may be defined electrochemically as a loss of electrons, while reduction involves a gain of electrons. Probes are used for measurement purposes in fluid processes, such as one entailing the controlled addition of chlorine. A probe consists of a noble metal electrode, such as a platinum-clad electrode, and a reference electrode which may be made, for example, of silver. These electrodes are immersed in the process solution. Electrical contact between the two electrodes is provided by the process solution. The voltage developed between the immersed electrodes is usually applied to a record-indicator.

The operation of the probe cell may become impaired due to excessive deposits on the electrodes. This will become evident through sluggish response of the recorder-indicator, that is, instead of abrupt changes in the chart with changes in signal level, the response will be smoothed out. In order to maintain the electrodes clean without the need to withdraw them from the operation, ultrasonic transducers are coupled thereto in accordance with the invention.

In FIG. 8, electrode 38 is the platinum-clad electrode, while electrode 39 is of silver, electrode 38 being longer in length. In practice, the platinum may be clad on a stainless steel core. The electrodes are connected to a recorder 43. Attached to the exterior ends of these electrodes and acoustically coupled thereto are ultrasonic transducers 40 and 41, respectively, which serve to generate ultrasonic energy when excited by an ultrasonic generator 42. The manner in which these transducers are attached to the electrodes and the manner in which the active surfaces thereof are continuously cleaned during operation, are generally comparable to the arrangement shown in connection with the flowmeter electrodes.

However, due to differences in length, weight, and the substance of the two electrodes, the resonant frequencies thereof are not matched. Matching is desirable in order to achieve efficient transmission of the ultrasonic energy. Hence interposed between transducer 41 and the shorter silver electrode 39, is a spacer or extension element 44 which is dimensioned to bring about a matching of the resonance properties of the two electrodes.

Thus, in practice, with a platinum-clad electrode 38 on a stainless steel body, the electrode length being 4¾ inches, the electrode was found to have a resonant frequency of 64 kilocycles. With a silver electrode 39, 3¼ inches in length, the resonant frequency was found to be 57.5 kilocycles. By adding a spacer 44 of stainless steel to the silver electrode, the overall length thereof was increased to 3⅝ inches to produce a resonant frequency of 64 kilocycles, thereby matching that of the platinum-clad electrode.

It must be borne in mind that the resonant frequency is not only a function of length, but also depends on the weight and nature of the electrode materials. Hence, even though with the spacer added, the silver electrode is still shorter than the platinum-clad electrode, the resonances thereof were nevertheless matched. With matched resonances, good cleaning action was observed at both electrodes. Filters may be employed on both signal leads going to the recorder in a manner similar to that shown in FIG. 7 in connection with a flowmeter.

Referring now to FIG. 9, showing the silver electrode 39 in detail, it will be seen that ultrasonic transducer 41 includes an annular piezoelectric crystal 45 sandwiched between contact plates 46 and 47, and supported above an insulating washer 48 of Pyrex glass or Pyroceram, to electrically isolate the crystal and yet provide good acoustic transmission to the electrode. The transducer is attached to the electrode 39 by means of a threaded bolt 49 passing through an insulating tube 50 of Teflon or similar material. Spacer ring 44 is interposed between the transducer and the electrode, in order to effect matching of resonances.

What I claim is:

1. A self-cleaning magnetic flowmeter adapted to operate accurately and without interruption when metering a contaminated fluid, said flowmeter comprising:
    (a) a flow tube through which the fluid to be metered is flowable,
    (b) means to establish a magnetic field across said tube,
    (c) and a pair of transducer-electrode assemblies, each having an electrode tip mounted in said flow tube, the two electrodes of said pair being disposed at diametrically opposed positions whereby a voltage induced in said fluid is picked up by said electrodes, and an ultrasonic transducer acoustically coupled to each electrode to produce ultrasonic energy which is transmitted by the associated electrode to the fluid in said tube to create cavitation effects therein acting to clean the tip of the electrode.

2. A flowmeter, as set forth in claim 1, wherein the electrode of said assembly is constituted by a tip section joining a head section through an exponential section, said transducer being coupled to said head section.

3. A flowmeter, as set forth in claim 1, wherein the electrode of said assembly is constituted by a tip section joining a head section through a step section, said transducer being coupled to said head section.

4. A flowmeter, as set forth in claim 1, wherein the transducer is constituted by a magnetostrictive element.

5. A flowmeter, as set forth in claim 1, wherein each assembly is constituted by a piezoelectric crystal element acoustically coupled to said electrode but electrically insulated therefrom.

6. A flowmeter, as set forth in claim 5, wherein said electrical insulation and acoustic coupling is effected by a crystal member.

7. A flowmeter system as set forth in claim 5, further including means to apply a high-frequency drive current to said crystal, and means to derive a low-frequency signal from said electrodes.

8. A flowmeter, as set forth in claim 1, wherein each assembly is constituted by a piezoelectric crystal element acoustically and electrically coupled to said electrode.

9. A flowmeter system as set forth in claim 8, further including first filter means to apply a high frequency drive current to said crystal and to block low frequency current therefrom, and second filter means to derive low frequency current from said electrodes and to block high frequency current therefrom.

References Cited

UNITED STATES PATENTS

| | | | |
|---|---|---|---|
| 2,514,080 | 7/1950 | Mason | 73—67.2 XR |
| 2,573,168 | 10/1951 | Mason et al. | 73—71.5 XR |
| 2,919,235 | 12/1959 | Roller | 204—222 XR |
| 3,177,709 | 4/1965 | Fischer | 73—194 |
| 3,341,430 | 9/1967 | Wickerham et al. | |

OTHER REFERENCES

Van Haagen et al.: "Ultrasonically Cleaned Electrode," Proceedings of the Symposium on Transducers for Oceanic Research, held Nov. 8–9, 1962 at San Diego, Calif., pp. 29–31.

CHARLES A. RUEHL, Primary Examiner

U.S. Cl. X.R.

204—222

UNITED STATES PATENT OFFICE
CERTIFICATE OF CORRECTION

Patent No. 3,479,873                      November 25, 1969

Henry Hermanns

It is certified that error appears in the above identified patent and that said Letters Patent are hereby corrected as shown below:

Column 3, line 40, "3,055,342" should read -- 3,005,342 --.
Column 5, line 54, "record-indicator" should read -- recorder-indicator --.

Signed and sealed this 10th day of November 1970.

(SEAL)
Attest:

Edward M. Fletcher, Jr.                  WILLIAM E. SCHUYLER, JR.
Attesting Officer                            Commissioner of Patents